July 29, 1969 S. M. HIBBARD 3,457,851
TREATMENT APPARATUS
Filed April 12, 1966 3 Sheets-Sheet 1
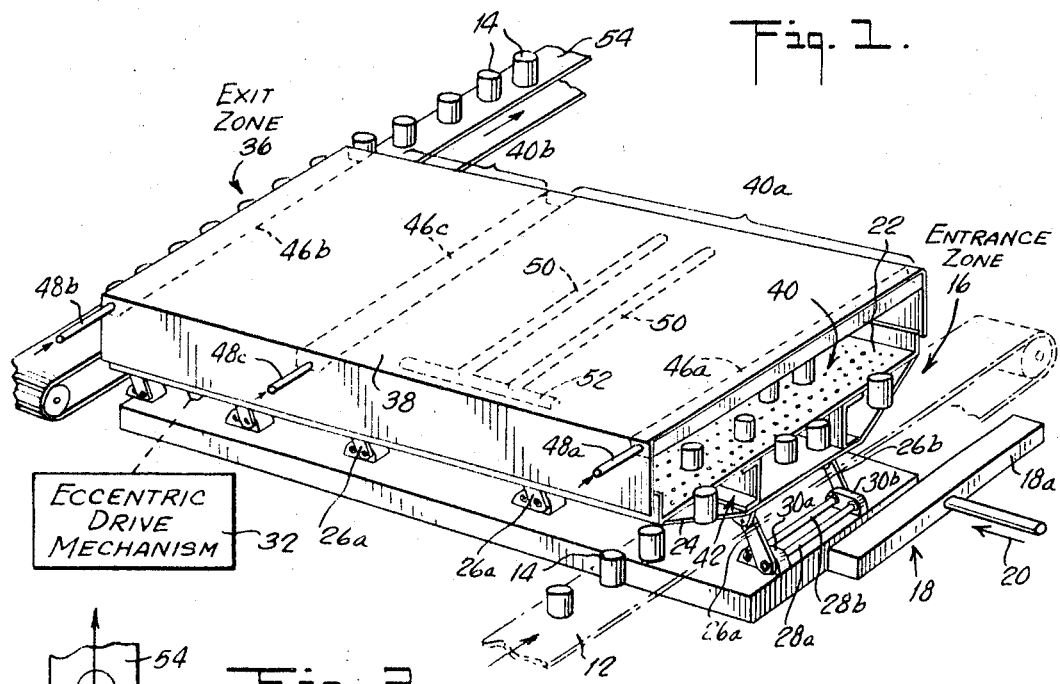
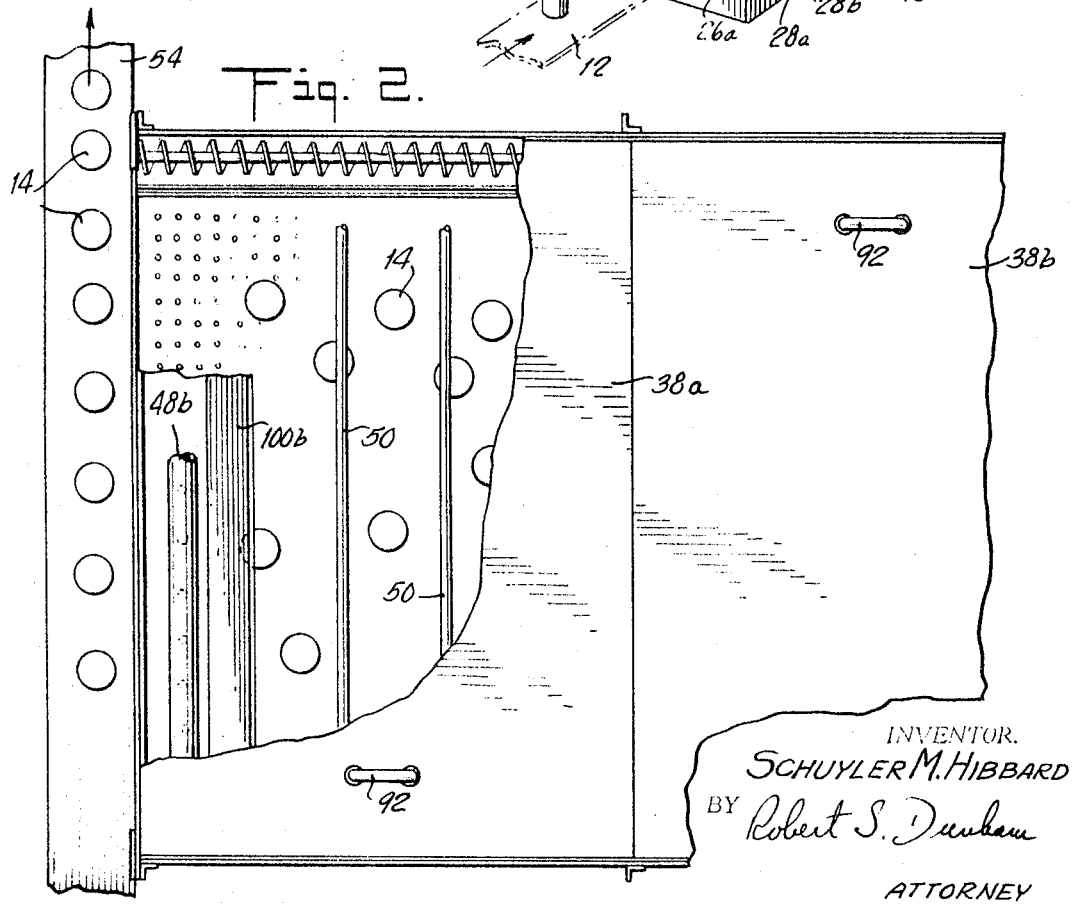
INVENTOR.
SCHUYLER M. HIBBARD
BY Robert S. Dunham
ATTORNEY

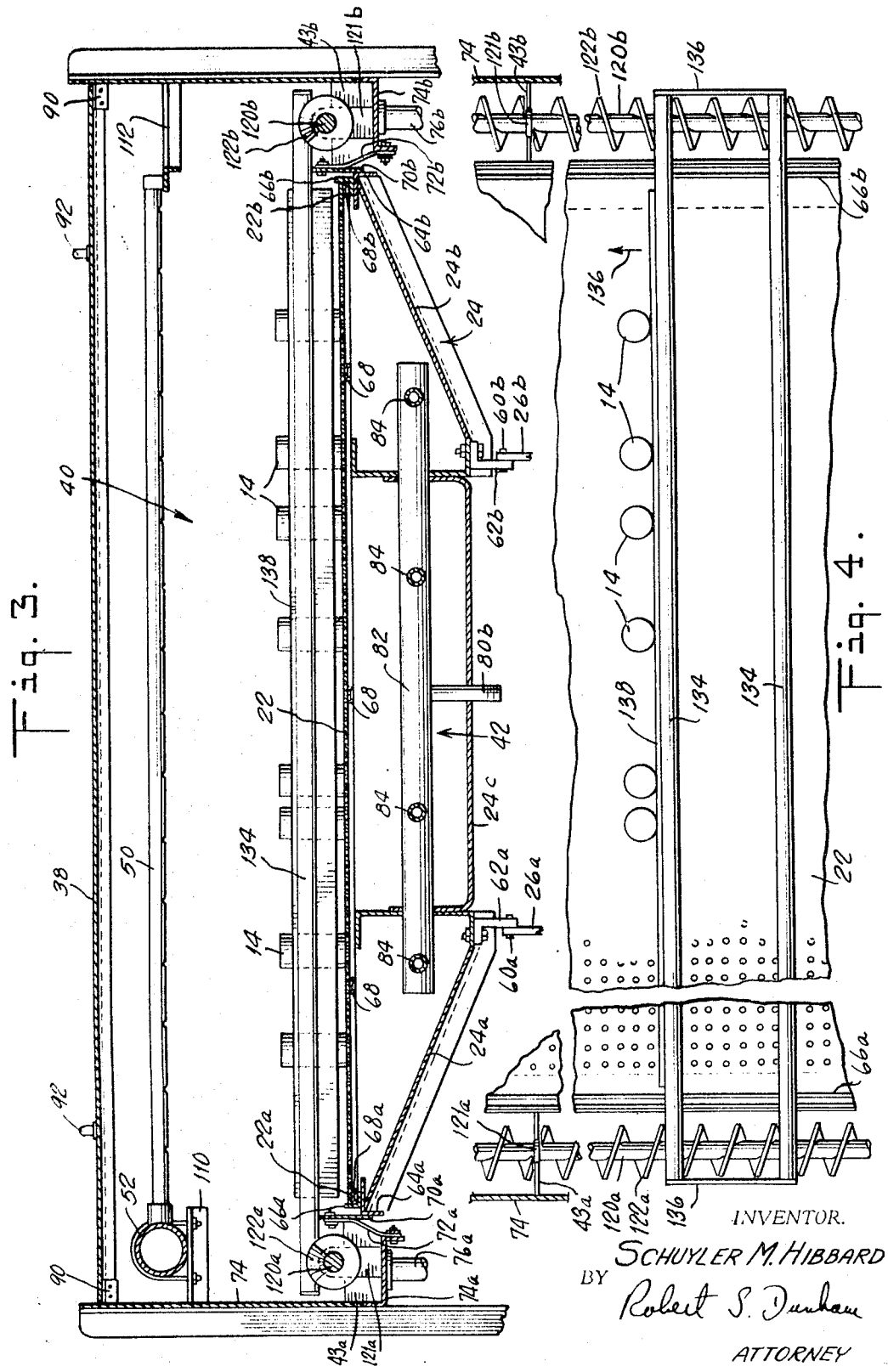

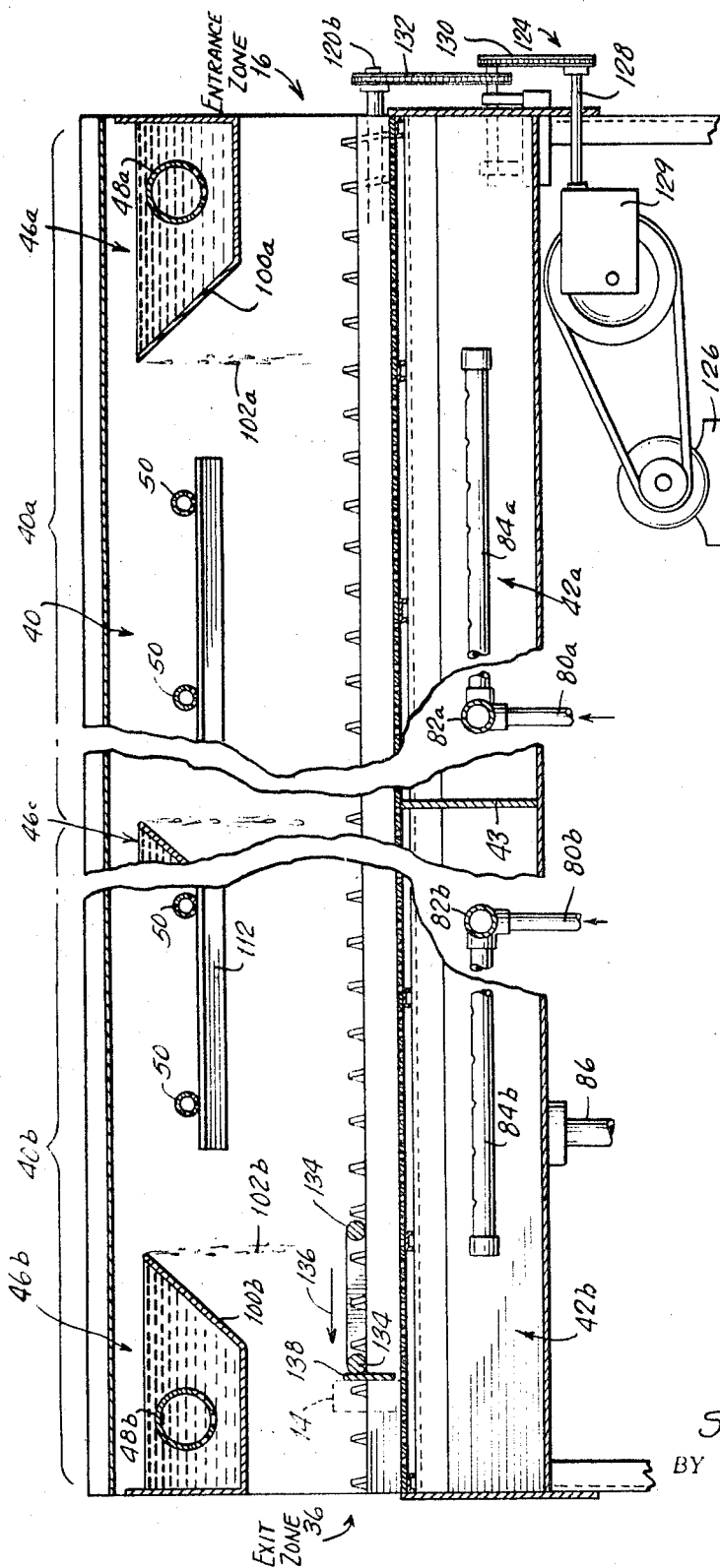

ced July 29, 1969

3,457,851
TREATMENT APPARATUS
Schuyler M. Hibbard, Penn Yan, N.Y., assignor to
 Lohmann Foods Corporation, Gorham, N.Y., a
 corporation of New York
Filed Apr. 12, 1966, Ser. No. 542,010
Int. Cl. B65b 55/06, 55/10
U.S. Cl. 99—249                                    17 Claims

ABSTRACT OF THE DISCLOSURE

An oscillating conveyor formed from a rigid fluid permeable platform closed therebeneath by a fluid impermeable trough, is utilized to convey articles to be treated through a treatment chamber which is defined by an open ended cover. For the treatment of articles by steam, steam is supplied beneath the platform and above the trough. A curtain of water at each open end of the chamber is provided to effectively seal the chamber while at the same time permitting the continuous passage of articles into and out of the chamber. A cooling liquid is also supplied from above the articles in the chamber to cool the articles. A pusher mechanism is employed to transfer the articles from an entrance zone onto the oscillating platform. A pair of rotating, threaded elements is provided along the sides of the chamber to move a bar member positioned across the platform through the chamber. The bar member engages articles on the oscillating platform aiding in the movement of the articles through the chamber.

---

This invention relates to the treatment of articles, particularly the treatment of articles with a fluid medium such as steam for pasteurization or water for cooling. In such treatment, articles to be treated, such as canned goods, are passed through a treatment zone in which they are subjected to the action of a fluid, such as steam or hot water. Typical treatment apparatus in the past has included a so-called walking beam conveyor which slowly conveys the articles through the treatment zone. A disadvantage of this type of arrangement is that at least part of the conveying apparatus is subjected to the treatment fluid, so that consideration must be given to the sealing of moving parts to avoid harmful effects from the fluid. A further disadvantage of most prior art devices is that they are subject to considerable heat loss out of the opens ends of the treatment chamber, which must be left open to permit the continuous passage of articles through the chamber.

It is desirable, therefore, to provide for the treatment of articles by fluid, utilizing apparatus in which the conveyor mechanism is not subjected to contact with the treatment fluid and which is not subject to considerable heat loss.

Accordingly, an object of the present invention is to provide improved apparatus for treating articles with fluid.

A further object of the invention is to provide for the treatment of articles by fluid in which the conveyor mechanism is isolated from the treatment zone so as not to be brought into contact with the treatment fluid.

Another object of the invention is to provide improved pasteurization apparatus subject to relatively little heat loss.

A further object of the invention is to provide improved pasteurization and cooling apparatus.

These and other objects of the present invention are obtained by utilizing a so-called "oscillating conveyor" for moving the articles to be treated through a treatment zone. Such a conveyor typically involves a rigid platform which is moved upwardly, forwardly, downwardly and backwardly many times each minute so that articles on the platform are moved across the platform in the forward direction. Such a platform is incorporated in the present invention and is made fluid permeable, typically by perforating it. A fluid impermeable trough is positioned beneath the platform and is closed across its top by the platform. The mechanism for oscillating the platform is positioned typically beneath the trough and connected to the outside of the trough. An open-ended cover is positioned over the platform to define a treatment chamber. For the treatment of articles by steam, steam is supplied by the space beneath the platform and above the trough so that steam passes upwardly through the platform and around the articles to be treated, which are positioned on the platform. A curtain or sheet of water at each open end of the chamber may be provided to effectively seal the chamber while permitting the continuous passage of articles into and out of the chamber. A network of pipes may be provided beneath the cover to provide a cooling liquid in the chamber which is supplied from above the articles to cool them. In either case, i.e., whether cooling water or steam is supplied to the chamber, the trough beneath the platform serves as a barrier to prevent the passage of the treatment fluid therethrough. Outlet pipes may be provided from the trough to convey away liquid either from the condensation of steam or from the water passing through the platform from above. Since the mechanism for oscillating the trough and platform is positioned outside of the trough, it is accordingly completely isolated from the treatment chamber and the treatment fluid. Hence elaborate sealing arrangements need not be employed. Further, by providing an additional curtain of water in a mid portion of the chamber and by dividing the trough underneath the platform into two separate compartments, the chamber may be divided so that one portion thereof is used for steam treatment and the other portion for cooling the heated articles.

Advantageously, the articles to be treated are conveyed to an entrance zone adjacent to one of the open ends of the treatment chamber. A pusher mechanism may be employed to transfer the articles from the entrance zone onto the oscillating platform. The articles are moved slowly across the platform by its oscillating movement until they reach the other open end of the chamber adjacent to an exit zone outside of the chamber. The articles are moved by the oscillation of the platform into the exit zone from which they may be conveyed away. A pair of rotating, threaded elements may be provided along the sides of the chamber, each extending from one open end of the chamber to the other open end. A bar member may be positioned across the platform having ends engaging the threaded elements. In this fashion, as the threaded elements rotate the bar member is moved above the platform from one end of the chamber to the other, engaging articles on the platform and moving them toward the exit zone. Such an arrangement is useful when there are relatively few articles on the platform for treatment and the oscillating movement of the trough and platform is not sufficient to move the articles into the exit zone.

The invention will be more completely understood by reference to the following detailed description, which is to be read in conjunction with the appended drawings, in which:

FIG. 1 is a perspective view of a representative treatment apparatus in accordance with the invention, shown in diagrammatic form.

FIG. 2 is a plan view of a portion of the apparatus shown in FIG. 1, partly broken away and to an enlarged scale, showing some of the details of the treatment apparatus.

FIG. 3 is a transverse section view of the treatment apparatus shown in FIG. 1, to an enlarged scale.

FIG. 4 is a fragmentary plan view of a portion of the apparatus shown in FIG. 3, looking downwardly onto the platform supporting articles to be treated from a position just above the platform.

FIG. 5 is a longitudinal sectional view of the treatment apparatus shown in FIG. 1, to an enlarged scale.

Referring to FIG. 1, a representative treatment apparatus in accordance with the invention is shown. The apparatus is illustrated diagrammatically in this figure, with many details being omitted for the purpose of simplicity. The apparatus to be described is principally for the treatment of articles by steam for pasteurization; additionally, a cooling arrangement is also shown.

A conveyor 12 conveys articles 14 such as canned goods to an entrance zone 16. A pusher mechanism 18 moving back and forth in the direction of arrow 20 and including a pusher bar 18a pushes the articles to be treated onto a fluid permeable platform 22. The platform 22, which may be perforated to render it fluid permeable, is positioned over and closes off the top of a fluid impermeable trough 24. The trough 24 is supported by associated pairs of links 26a and 26b. The links in each pair are pivotally attached at their upper ends to the trough; at their lower ends they are respectively connected to shafts 28a and 28b supported in support structures 30a and 30b. Resilient bushings, such as of rubber, are included in the links 26a and 26b so as to permit a rocking motion in the links, as caused by movement of the trough as described below. An eccentric drive mechanism 32, typically employing an eccentric shaft (not shown), is coupled to the trough 24 and oscillates the trough upwardly, forwardly (from right to left in FIG. 1), downwardly and backwardly (from right to left in FIG. 1) many times each minute. The movement of the trough is such that articles on the platform are thrown upwardly and forwardly in the air. While the articles are in the air and before they have settled on the platform the downward and backward platform movement takes place. In this fashion, articles 14 pushed onto the platform 22 are moved slowly across the platform from the entrance zone 16 toward an exit zone 36. The time taken for the articles to move from the entrance zone to the exit zone is easily regulated by appropriate control of the oscillation of the platform. It has been found that for the pasteurization of glass jars, for example, the platform may be 40 feet long and 4 feet wide, oscillated 500 times each minute with a 1/8" stroke in each of the forward and backward directions to pasteurize 120 jars per minute each with a total pasteurization time of 30 minutes.

The platform and trough are partially enclosed by a cover 38 open at both of its ends, which defines a treatment chamber 40 below the cover and above the platform. Steam is admitted to space 42 above the trough 24 and below the perforated platform 22. The details of the steam supply system are shown in FIGS. 3 and 5, to be described later. Steam flows upwardly through the perforations in the platform 22 and past the articles 14 on the platform so as to heat the articles for treatment, such as pasteurization. Steam remains in the chamber 40, cools and condenses. Condensed water passes downwardly through the perforated platform 22 and is drained from the trough 24.

Weirs 46a and 46b are provided at the ends of the chamber 40 and are supplied with water via inlet pipe 48a and 48b. Water fills the weirs and overflows, cascading downwardly in an unrestrained curtain or sheets of water at each end of the chamber 40 to provide a closure for each of the open chamber ends. In this fashion, steam is retained within the chamber. The curtains of water reduce heat loss from the chamber while permitting articles to be continuously conveyed into and out of the chamber. An additional weir 46c may be included in a mid portion of the chamber to provide an additional curtain of water if desired so as to divide the chamber 40 into two parts or subchambers, one (40a) for steam treatment of articles and the other (40b) for cooling the articles, as described below.

A plurality of perforated pipes 50 connected to a common supply pipe 52 may be positioned along the top of the chamber 40 beneath the cover 38 to provide flows of water downwardly onto the articles 14 as they are moved across the platform 22. Such an arrangement is useful for the cooling of the articles in the event that pasteurization is not taking place. When pasteurization is taking place in portion 40a of the treatment chamber and it is desired to cool articles in the portion 40b, water is supplied only to the pipes 50 in that portion of the chamber. The common supply pipe 52 may be divided into two sections, one in each portion of the chamber for this purpose.

After passing through the chamber 40, the articles 14 on the platform 22 are moved by the platform oscillation into the exit zone 36 from which they are conveyed away by a conveyor 54.

By the use of the trough 24 positioned below the perforated platform 22, the conveyor drive mechanism 32, as well as the links 26, associated shafts 28 and bearing structures 30 are all isolated from the treatment chamber 40 and the treatment fluid. Suitable drain outlets may be provided from the trough to convey away water which has condensed from steam or water passing downwardly through the platform 22 from the pipes 50. Hence there are no moving drive mechanisms within the treatment chamber to be sealed from the treatment fluid, with the exception of a screw conveyor mechanism described later in connection with FIGS. 2, 3, 4 and 5.

Referring to FIG. 3, the details of the trough 24 are shown. The trough may be formed from three plate sections 24a, 24b and 24c. The links 26a and 26b are respectively connected by pivot pins 60a and 60b to flanges 62a and 62b bolted to the trough sections 24a and 24b. Any number of pairs of links 26a and 26b may be employed as required to support the trough 24 for oscillation as described above. Angle irons 64a and 64b are secured to the top edges of the trough sections 24a and 24b and provide a support for angle irons 66a and 66b. These latter angle irons support the perforated platform 22 along its side edges 22a and 22b. Advantageously, a plurality of stringers 68 may be secured to the bottom side of the platform 22 to provide rigidity to the platform. The two side stringers 68a and 68b may support the platform on the angle irons 66a and 66b. Plates 70a and 70b extend along the edges of the angle irons 64a and 64b and are secured thereto. These plates in turn support strips 72a and 72b of flexible material which are also attached to flanged portions 74a and 74b forming extensions of side plates 74. The side plates 74 form a part of the general framework of the system, and hence are fixed in position. The flexible strips 72a and 72b permit the trough and platform to be oscillated relative to the general framework. Drainpipes 76a and 76b may be coupled to the side plate extensions 74a and 74b to drain away fluid accumulating on top of the extensions.

The perforated platform 22 and the trough sections 24a, 24b and 24c together define the space 42 which receives steam for passage upwardly through the perforated platform. A plate 43 (FIG. 5) may be secured to the trough sections and to the platform to divide the space 42 into two compartments 42a and 42b. The steam may be supplied to the compartments 42a and 42b by way of two steam input lines 80a and 80b (FIGS. 3 and 5) coupled to associated header pipes 82a and 82b. The steam input lines 80a and 80b may be connected by flexible steam hoses (not shown) to the steam generating equipment (not shown) so as to permit the oscillation of the trough 24. The header pipes 82a and 82b extend respectively across the compartments 42a and 42b in the transverse direction. Extending generally perpendicular to the header pipes 82a and 82b are pipes 84a and 84b, respectively, which extend longitudinally respectively within the compartments 42a and 42b. The pipes 84a and 84b may be perforated along their upper surfaces so that steam may pass from the pipes upwardly into the compartments 42a and 42b. Drains 86a and 86b (FIG. 5) may be secured to trough section 24c to provide for the drainage of any liquid accumulating on top of the trough section within these compartments. Similar drains (not shown) may be provided at the lower portions of trough sections 24a and 24b. All these drains may be coupled to flexible hoses (not shown) to an appropriate collection chamber (not shown) so as to permit the oscillation of the trough 24.

The plate 43 dividing the space 42 into two compartments is positioned just ahead of the weir 46c. When it is desired to utilize subchamber 40a for steam treatment and subchamber 40b for cooling, steam is admitted only to input line 80a so as to pass only into compartment 42a. As noted above, cooling water is supplied only to the pipes 50 in the subchamber 40b. The weir 46c effectively isolates the subchambers 40a and 40b from each other.

It will be noted that the trough sections 24a, 24b and 24c effectively isolate all the oscillation mechanism that is positioned outside the trough sections. In this fashion, elaborate sealing arrangements for the oscillation mechanism need not be provided.

As shown in FIG. 3, the cover 38 extends over the treatment chamber 40. The cover advantageously may rest upon angle irons 90 secured to the top edges of the side plates 74. As shown in FIG. 2, the cover 38 may be formed from a plurality of sections such as 38a, 38b . . . any convenient number of which may be employed. Advantageously, the cover sections are provided with handles 92 to aid in removing the sections for cleaning, if desired.

Referring again to FIG. 5, the weirs 46a and 46b positioned at the ends of the treatment chamber 40 are shown in detail. The weirs are formed from troughs 100a and 100b extending transversely across the chamber adjacent to the entrance and exit zones. The pipes 48a and 48b extend through the troughs and are perforated along their bottom portions. Water supplied to the pipes 48a and 48b passes through the perforations in the pipes and fills the troughs so as to overflow in uniform unrestrained curtains or sheets of water designated 102a and 102b. The curtains of water provided by the weirs effectively seal off the ends of the chamber 40 so that steam cannot pass out of the chamber. It has been found that the curtains of water provide excellent seals for the chamber, enabling high temperatures to be rapidly achieved following an initial start-up. At the same time, articles can be moved into and out of the chamber continuously without disturbing the seals effected by the curtains of water. The weir 46c effectively divides the chamber 40 into two subchambers 40a and 40b, as described above. The weir 46c is constructed and operated in the same fashion as the weirs 46a and 46b.

Referring to FIG. 3, the side plates 74 carry brackets 110 and 112 extending along the length of the chamber 40. The bracket 110 supports the header pipe 52 which is supplied with water or another coolant. Pipes 50 connected to the header pipe 52 extend transversely across the chamber 40, as shown in FIGURES 2, 3 and 5. The pipes 50 are perforated along the bottom portions thereof so that the water therein may pass out of the pipes and downwardly into the chamber 40. Hence streams of coolant are provided for cooling the articles 14 passing through the treatment chamber, if this is desired. The coolant passes through the perforations in the platform 22 and through the drains in the trough 24. As in the case of the steam supplied to the chamber 40, the coolant is isolated from the mechanism for oscillating the trough and platform.

Referring to FIGS. 3 and 4, shafts 120a and 120b are positioned adjacent to the sides of the chamber 40 and extend longitudinally through the chamber. The shafts are supported by bearings such as 121a and 121b along the lengths thereof and carried by the side plates 74, and hence are free from the platform 22. The shafts are respectively formed with thread flights 122a and 122b. The shafts 120a and 120b are driven by a driving mechanism 124 shown in FIG. 5. The driving mechanism includes a motor 126, which ultimately powers a shaft 128 through a reduction gear box 129. The shaft 128, through the action of belt drives 130 and 132, drives the shafts 120a and 120b and causes them to rotate. As shown in FIG. 4, a pair of rods 134 connected together and spaced parallel from each other by plates 136 are positioned so that their ends engage the thread flights 122a and 122b. As the shafts 120a and 120b rotate, the rods 134 riding in the thread flights are caused to move in the direction of arrow 136, i.e., to move above the perforated platform 22 from one end of the chamber to the other. One of the rods 134 may include a pusher plate 138 which engages the articles 14 positioned on the perforated platform to move the articles through the chamber (see also FIG. 5). The rods 134 associated with pusher plate 138 are only used in the event that articles on the platform are not oscillated off the platform into the exit zone 36. This may occur when there are relatively few articles on the platform. In such a case, the rods and associated pusher plate may be dropped into place, engaging the thread flights to push the articles off the platform. It should be noted that the rods may be easily removed simply by lifting them from engagement with the thread flights and removing them from the treatment chamber. In this connection, the shafts 120a and 120b are normally rotated at a speed such that the articles 14 will be pushed through the chamber at the same speed that they normally travel through the chamber by virtue of the oscillation of the trough 24 and platform 22.

As shown in FIG. 3, plates 43a and 43b are positioned at the bearings 121a and 121b. Such plates are positioned in line with the plate 43 dividing the space 42 into compartments 42a and 42b. The plates 43a and 43b are for the purpose of separating hot and cold water in the chamber 40 about the shafts 120a and 120b when the chamber is used for both steam treatment and cooling, as described above. It should be noted that at these plates the thread flights 122a and 122b are necessarily interrupted. The mechanism of pusher plate 138 is not affected by this interruption in thread flights since when one of the rods 134 is out of engagement with the thread flights, the other rod is in engagement. Hence the pusher plate continues uninterruptedly past the interruption in thread flights.

A representative, presently preferred embodiment of the invention has been disclosed. It will be understood that the particular embodiment disclosed may be subject to modification. The invention accordingly should be taken to be defined by the following claims.

What is claimed is:
1. Treatment apparatus comprising:
   (a) a fluid permeable platform,
   (b) a fluid impermeable trough beneath the platform and closed across the top thereof by the platform,
   (c) means for oscillating the trough so that articles positioned on top of the platform are moved across the platform, and
   (d) means for introducing a fluid above the trough.

2. Treatment apparatus as defined in claim 1, wherein the means (d) discharges a liquid from above the platform.

3. Treatment apparatus as defined in claim 1, wherein the means (d) discharges a hot fluid above the trough for pasteurizing articles on the platform.

4. Treatment apparatus comprising:
   (a) a fluid permeable platform,
   (b) a fluid impermeable trough beneath the platform and closed across the top thereof by the platform,
   (c) means for oscillating the trough so that articles positioned on top of the platform are moved across the platform, (d) plate means for dividing the trough beneath the platform into two compartments, and
(e) means for introducing steam into a first one of the compartments.

5. Treatment apparatus as defined in claim 4, including means for discharging a coolant from above the platform over a second one of said two compartments.

6. Treatment apparatus as defined in claim 5, including cover means for forming a treatment chamber above the platform, and means for forming a curtain of liquid in said chamber so as to divide said chamber into two subchambers positioned over said compartments.

7. Treatment apparatus as defined in claim 6, wherein said cover means is open at ends thereof so as to provide said chamber with open ends, and means for forming curtains of liquid adjacent to the open ends of the chamber so as to form effective barriers to retain steam within the chamber.

8. Treatment apparatus comprising:
(a) a fluid permeable platform,
(b) a fluid impermeable trough beneath the platform and closed across the top thereof by the platform,
(c) means for oscillating the trough so that articles positioned on top of the platform are moved across the platform, and
(d) steam generating means for introducing steam into the space beneath the platform and above the trough.

9. Treatment apparatus as defined in claim 8, including cover means for forming a treatment chamber above the platform.

10. Treatment apparatus as defined in claim 9, wherein said cover means is open at ends thereof so as to provide said chamber with open ends, and including means for forming curtains of liquid adjacent to the open ends of the chamber so as to form effective barriers to retain steam within the chamber.

11. Treatment apparatus as defined in claim 10, including first conveying means for delivering articles to an entrance zone adjacent to one of the open ends of said chamber, means for transferring articles from said entrance zone onto said platform, and second conveyor means at an exit zone adjacent to the other open end of said chamber for removing articles as they are moved through the chamber and into the exit zone by the oscillating movement of the trough.

12. Treatment apparatus as defined in claim 11, including pusher means for pushing articles on the platform toward the exit zone to add to the movement of said articles toward the zone by the oscillating movement of the trough.

13. Treatment apparatus as defined in claim 12, wherein said pusher means comprises a pair of rotating threaded elements positioned on both sides of the platform and extending from one of the open ends of the chamber to the other open chamber end, and at least one bar extending across the platform having ends thereof engaging the rotating threaded elements so that as said elements are rotated said bar is moved over the platform from one end of the chamber to the other to push articles on the platform toward the exit zone.

14. Treatment apparatus as defined in claim 13, including means for discharging a coolant from above the platform.

15. Treatment apparatus as defined in claim 14, wherein said fluid permeable platform is formed from a perforated plate.

16. Treatment apparatus as defined in claim 15, including plate means for dividing the trough beneath the platform into two compartments, said steam generating means introducing steam into a first one of the compartments, and including means for forming a curtain of liquid in said treatment chamber so as to divide said chamber into two subchambers positioned over said compartments, said means for discharging a coolant from above the platform discharging said coolant over a second one of said two compartments.

17. Treatment apparatus comprising:
(a) means defining a chamber for the treatment of articles and having an opening through which articles pass into or out of the chamber, and
(b) means for forming an unrestrained sheet of liquid flowing across said opening in a direction transverse to the movement of the articles through the opening so as to form an effective liquid seal for said chamber.

References Cited
UNITED STATES PATENTS

| | | | |
|---|---|---|---|
| 2,282,187 | 5/1942 | Herold | 99—214 |
| 2,569,645 | 10/1951 | Viall | 99—361 |
| 2,692,200 | 10/1954 | Olson | 99—216 X |
| 2,760,873 | 8/1956 | Munz | 99—370 X |
| 2,874,841 | 2/1959 | Peterson | 259—75 X |
| 3,039,379 | 6/1962 | Brown | 99—360 |
| 3,101,995 | 8/1963 | Beauvais | 99—182 X |

ROBERT W. JENKINS, Primary Examiner

U.S. Cl. X.R.

99—214